United States Patent [19]

Loyd, Jr. et al.

[11] 3,924,978

[45] Dec. 9, 1975

[54] COUPLING MEANS FOR A SECTIONAL DRIVE SHAFT OF A ROTARY MECHANISM

[75] Inventors: Robert William Loyd, Jr., Wyckoff; Raymond P. Wallace, Montclair, both of N.J.

[73] Assignee: Curtiss-Wright Corporation, Wood-Ridge, N.J.

[22] Filed: Sept. 26, 1974

[21] Appl. No.: 509,397

Related U.S. Application Data

[63] Continuation of Ser. No. 434,824, Jan. 18, 1974, abandoned.

[52] U.S. Cl. .......... 418/60; 418/212; 123/8.07; 403/374; 403/297; 403/290
[51] Int. Cl.² ... F01C 1/02; F02B 53/00; F16B 2/14; F16B 7/00
[58] Field of Search ............. 418/60, 200, 210–214; 123/8.07; 403/47, 290, 296, 297, 374, 409

[56] References Cited
UNITED STATES PATENTS

| | | | |
|---|---|---|---|
| 389,028 | 9/1888 | Wallace | 85/1 R |
| 1,910,121 | 5/1933 | Muntz | 403/374 |
| 2,010,525 | 8/1935 | McHugh | 403/46 |
| 2,816,769 | 12/1957 | Noble | 403/374 |
| 3,077,867 | 2/1963 | Froede | 418/210 |
| 3,279,279 | 10/1966 | Takebayashi | 123/8.07 |

*Primary Examiner*—John J. Vrablik
*Attorney, Agent, or Firm*—Arthur Frederick; Victor D. Behn

[57] ABSTRACT

The multi-sectional drive shaft for a rotary mechanism having a plurality of modular units comprises a drive shaft section for each modular unit which drive shaft sections are connected together at their adjacent end portions by constructing and arranging the drive shaft end portions to be in telescopic abutting relationship and by a coupling means which is carried in the end portion of one of the drive shaft sections and actuatable so as to exert radially directed forces on the said one drive shaft section and thereby maintain said drive shaft sections in abutting relationship for torque transmission from one drive shaft section to the other.

5 Claims, 4 Drawing Figures

3,924,978

COUPLING MEANS FOR A SECTIONAL DRIVE SHAFT OF A ROTARY MECHANISM

This is a continuation of application Ser. No. 434,824, filed Jan. 18, 1974, now abandoned.

This invention relates to a sectional mainshaft or drive shaft for a rotary mechanism having plural modular units and, more specifically, to coupling means for connecting the drive shaft sections together.

BACKGROUND

Heretofore, many different coupling means have been employed to connect together adjacent drive shaft sections as exemplified in the following U.S. Patents:

| | |
|---|---|
| Herr | 1,858,014 |
| Butterfield | 2,595,761 |
| Froede | 3,077,867 |
| Jones | 3,240,423 |
| Takebayashi | 3,279,279 |
| Kuroda | 3,352,290 |
| Sharples | 3,620,656 |

None of these various apparatuses have proven entirely satisfactory because of such factors as complexity, costlines, difficulty of machining or assembly. Another disadvantage of some of the heretofore known drive shaft assemblies is that they did not lend themselves to a modular rotary mechanism where a unit could be disassembled without disassembly of the entire mechanism.

It is therefore an object of the present invention to provide in a multi-sectional drive shaft for a rotary mechanism an improved coupling means for connecting together adjacent drive shaft sections which is relatively simple and inexpensive to fabricate.

Another object of this invention is to provide in a multi-sectional drive shaft for a rotary mechanism an improved coupling means for connecting together adjacent drive shaft sections which is accessible from outside of the mechanism for making the connection and disconnection.

A further object of the present invention is to provide a coupling means for a multi-sectional drive shaft of a modular rotary mechanism which coupling means permits the removal and replacement of an inner unit without disassembly and reassembly of the other units.

SUMMARY

Accordindly, the present invention contemplates for multi-sectional drive shaft (or mainshaft) for a rotary mechanism having a plurality of modular units a coupling means for connecting adjacent drive shaft sections together or torque transmission. The coupling means comprises constructing the end portions of the adjacent drive shaft sections so that they are telescopically receivable one within the other and providing a wedge or force means disposed within the end portion of one of the drive shaft sections. The coupling means also includes an actuating means coacting with the wedge means and end portions to cause the wedge means to exert radially outwardly directed forces on the inner end portion of one drive shaft section to hold the latter in tight abutment against the outer end portion of the other drive shaft section. A passageway means is provided in the drive shaft sections so that the actuating means is accessible from outside the rotary mechanism. This accessibility of the actuating means of the coupling means permits inner units of a modular rotary mechanism to be removed and replaced without disassembly and reassembly of one or more other units.

BRIEF DESCRIPTION OF THE DRAWINGS

The invention will be more fully understood from the following description when considered in connection with the accompanying drawings in which.

DESCRIPTION OF PREFERRED EMBODIMENTS

Figure 1:
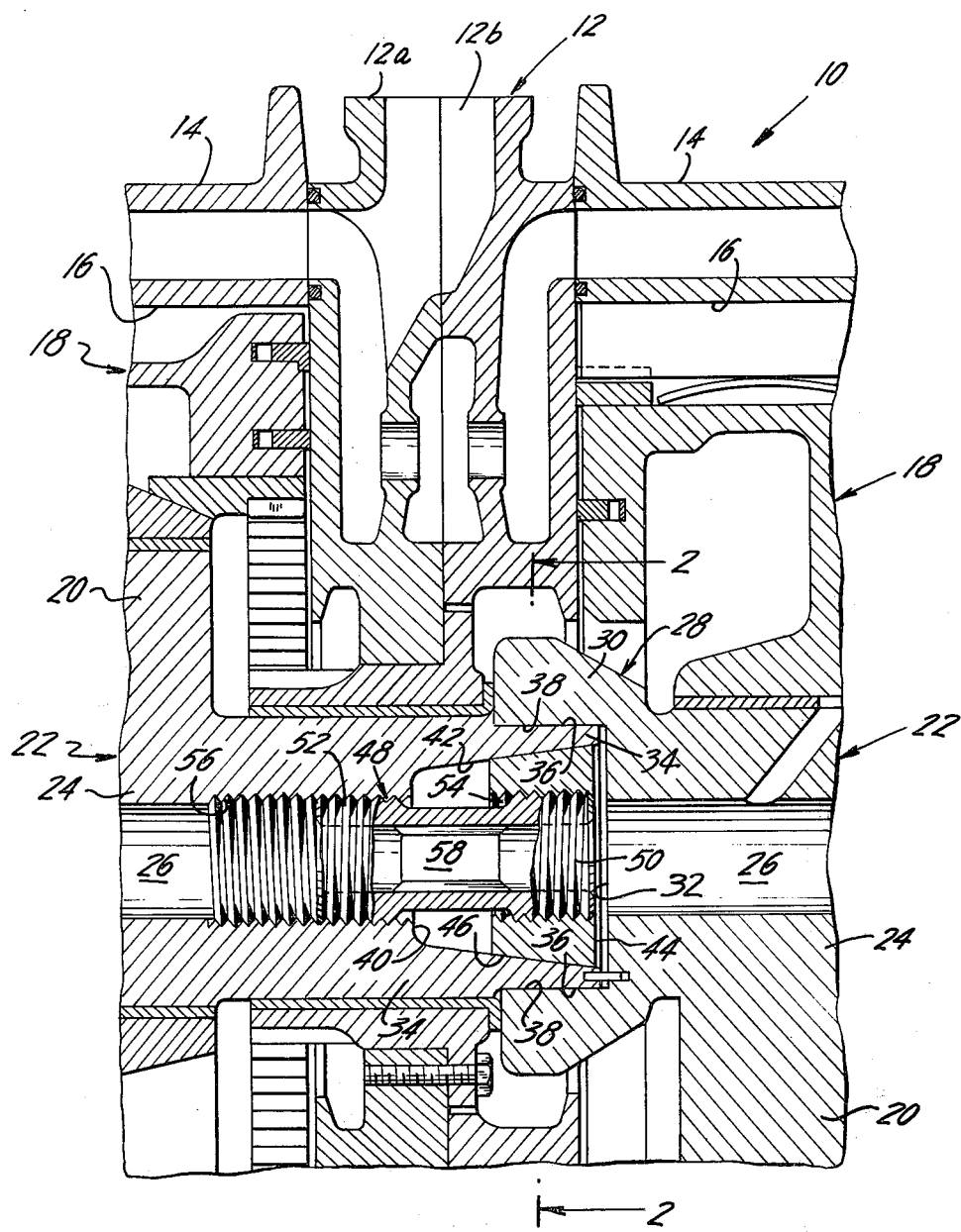
FIG. 1 is a fragmentary cross-sectional view of a multi-modular rotaty mechanism having a multi-sectional crankshaft according to this invention.
Figure 2:
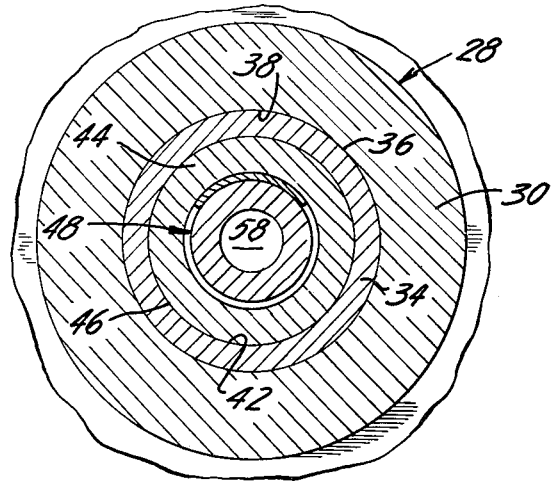
FIG. 2 is a cross-sectional view taken substantially along line 2—2 of FIG. 1.
Figure 3:
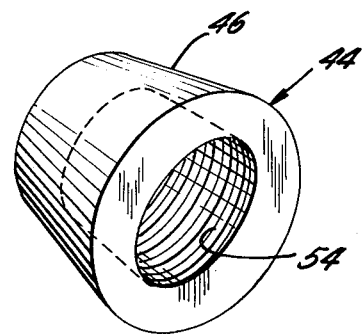
FIG. 3 is a view in perspective of the wedge means which is a component of this invention.

Now referring to the drawings and more particularly to FIGS. 1 to 3, the reference number 10 generally designates a rotary mechanism of the modular type having a plurality of rotor-housing units such as disclosed in the U.S. Patents to Bentele, U.S. Pat. No. 3,062,435; Froede, U.S. Pat. No. 3,077,867; Jones, U.S. Pat. No. 3,240,423 and Takebayashi, U.S. Pat. No. 3,279,279. The rotary mechanism 10 may be an internal combustion engine, expansion engine, pump or compressor of the Wankel type having a triangular profiled rotor eccentrically orbiting in a two-lobe epitrochoidal housing cavity such as shown in the aforesaid U.S. patents. The rotary mechanism as herein illustrated comprises axially spaced end walls (not shown) and split intermediate walls 12 spaced from each other and the end walls (not shown) by peripheral walls 14, the walls defining therebetween a plurality of cavities 16. A rotor 18 is disposed in each cavity 16 and is supported for orbital movement within its associated cavity on an eccentric portion 20 of a sectional mainshaft or drive shaft 22 according to this invention. The wall sections 12a and 12b of each of the split intermediate walls 12 are peripherally secured, together by a plurality of peripheral bolts (not shown), while wall sections 12a and 12b may be secured in abutment against the adjacent peripheral walls 14 by a plurality of internal tie-bolts (not shown). This assembly means is more fully disclosed in the aforesaid patent to Takebayashi, U.S. Pat. No. 3,279,279. The drive shaft 22 comprises a plurality of drive shaft sections 24 each of which includes one eccentric portion 20 and an axial bore 26. The bores 26 serve to define a lubricant supply passageway for conducting lubricant to the engine bearings as is conventional and shown in the patents to Froede, U.S. Pat. No. 3,077,867 and Jones U.S. Pat. No. 3,240,423 and to provide a tool access passageway as hereinafter more fully described. Each drive shaft section 24 is of a length approximately equal to the distance between the abuting wall sections 12a and 12b of next adjacent intermediate walls 12. The end walls and wall sections defining each of the cavities 16, the rotor 18 and drive shaft section 24 associated with each cavity 16 constitutes a module or unit. The modules of rotary mechanism 10 may be secured together as an alternative assembly means to that aforesaid by external, through tie-bolts (not shown) such as shown in the U.S. Pat. to Jones U.S. Pat. No. 3,240,423. To permit the removal and replacement of an inner module without disassembly and subsequent reassembly of adjacent modules, the adjacent drive shaft sections 24 are connected together by a coupling means 28 in accordance with this invention.

The coupling means 28 comprises the provision of constructing one end portion 30 of drive shaft section 24 with an annular, coaxial recess 32 dimensioned to snugly receive therein the other end portion 34 of the next adjacent drive shaft section 24. As shown, end portion 34 may be provided with a reduced diameter portion dimensioned to be snugly receivable in recess 32 and thereby provide an outer peripheral surface 36 which abuts the annular surface 38 of recess 32. The end portion 34 is provided with a frusto-conical, coaxial recess 40 which forms an inner peripheral surface 42 which tapers radially inwardly in an inward direction along the axis of the drive shaft section. A force means or wedge element 44 having an outer peripheral surface 46 tapered in an axial direction to be complementary to tapered surface 42 is disposed in recess 40. To axially move wedge element 44 in recess 40 relative to end portion 34, an actuating means or threaded sleeve 48 is provided. The opposite end portions of sleeve 48 are externally threaded at 50 and 52. The wedge element 44 is provided with a threaded bore 54 which is constructed and arranged to receive, in meshing relationship, threaded end portion 50 of sleeve 48. A portion of bore 26 in drive shaft section 24 is threaded at 56 to receive in meshing relationship threaded end portion 52 of sleeve 48. To provide for rotation of sleeve 48, the sleeve has an axial bore which is substantially coaxial with bores 26 and is provided with a polygonal shaped internal portion S8 to receive a tool (not shown) of the Allen wrench type. Preferably, the threads of meshing threaded portions 50 and 54 are of different pitch than the threads of meshing threaded portions 52 and 56 so that rotation of sleeve 48 will effect movement of wegde element 44 relative to recess 40.

The coupling means 28 is effective to achieve interconnection of adjacent drive shaft sections 24, by drawing wedge element 44 to the left, as viewed in FIGS. 1, through rotation of sleeve 48 in the appropriate direction depending upon the "hand" of the meshing threads of portions 50, 54 and 52, 56. This movement of wedge element 44 forces the tapered surface 46 of the wedge element against surface 42 of recess 40 thereby exerting on end portion 34 radially outwardly directed forces. These forces drive peripheral surfaces 36 in tight abutment against or interference fit with surface 38 of recess 32 in end portion 30 of the adjacent drive shaft section 24. It has been calculated for a particular engine design that to provide sufficient interference fit at surfaces 36 and 38 to effect transmission of about 236,250 inch-pounds of torque through such joint in an end portion 34 of 7 inches in diameter and a surface 36 of a width of 2.75 inches, the force exerted on end portion 34, would have to be sufficient, if end portion 34 was not constrained by end portion 30, a total displacement outwardly of end portion 34 of about 0.0096 inches. This expansion would require the wedge element to exert a force of 36,340 pounds per square inch on end portion 34. The axial force on sleeve 48 necessary to move wedge element 44 to effect such expansion of end portion 34 would be about 9.060 pounds. To insure that drive shaft end portion 30 is sufficiently strong to absorb the outwardly directed radial forces of the magnitude herein involved, end portion 30 may be enlarged as is illustrated in the drawings.

To disconnect the adjacent drive shaft sections 24, an Allen wrench type tool (not shown) is inserted from outside rotary mechanism 10 into bores 26 and sleeve 48 so as to engage internal portion 58. The tool is rotated so as to turn sleeve 48 in a direction to cause wedge element 44 to move to the right as viewed in FIG. 1 and thus relieve the radially, outwardly directed forces on end portion 34. The movement of wedge element 44 to release the interference fit between surfaces 36 and 38 of the respective drive shaft end portions 34 and 30 need only be a small movement. Thereafter, to expose for disassembly the selected module or unit, the tie-bolts (not shown) which secure the intermediate wall sections 12a and 12b together are removed to permit the separation of the rotary mechanism 10 at the abutting surfaces of walls 12a and 12b, the drive shaft sections 24 separating at surfaces 36 and 38.

While sleeve 48 has been described as preferably having threaded end portions 50 and 52 of the same hand but of different pitch, the threaded end portions may be of opposite "hand" as is disclosed in the U.S. Patent to Butterfield, U.S. Pat. No. 2,595,761. The advantage of a sleeve having threads of the same hand but different pitch as compared with opposite hand threads of the same pitch is that the former provides a self-locking connection while the latter does not.

Figure 4:
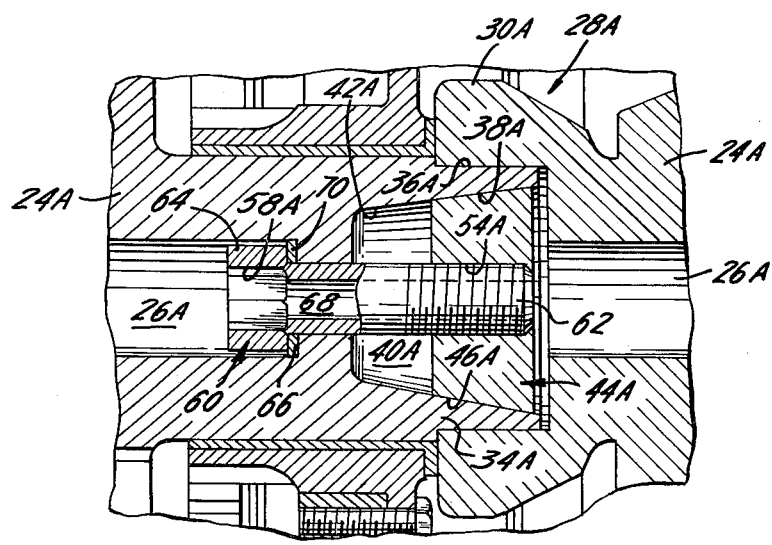
FIG. 4 is a fragmentaty view, similar to FIG. 1, showing another embodiment of the present invention.

In FIG. 4 is shown an alternative embodiment of the present invention wherein the coupling means 28A is a bolt 60 instead of externally threaded sleeve 44 as disclosed in the embodiment illustrated in FIGS. 1 to 3. The parts of the apparatus shown in FIG. 4 corresponding to parts of the embodiment shown in FIGS. 1 to 3 will be designated by the same reference number but with the suffix A added thereto.

As shown in FIG. 4, bolt 60 has a threaded shank portion 62 which is threadably receivable in threaded bore 54A of wedge element 44A while the head portion 64 abuts an annular shoulder 66 formed in bore 26A of each of the drive shaft sections 24A. The head portion 64 is suitably constructed to receive a tool (not shown) so that it can be turned to move wedge element 44A relative to recess 40A. As shown, head portion 64 may be provided with a polygonal shaped recess 58A which can receive an Allen wrench type tool (not shown). To provide a continuous fluid flow path through bores 26, each of the bolts 60 may be provided with an axial bore 68 which communicates with recess 58A and extends through shank portion 62. The wedge element 44A may be inserted in recess 40A with sufficient force to provide an interference fit between surfaces 42A and 46A to resist turning of the wedge element 44A when bolt 60 is initially turned to draw wedge element 44A into recess 40A. A lockwasher 70 may be interposed between head portion 64 of bolt 60 and shoulder 66 to hold the bolt in position. To disconnect coupling means 28A, bolt 60 is turned so as to permit wedge element 44A to move outwardly relative to recess 40A. In relieving the tension on bolt 60 the bolt head portion 64 may move off shoulder 66 leaving thereby wedge element 44A still tightly held in recess 40A. However, by striking an axial blow through a tool (not shown) or a separate rod-like element (not shown) on bolt 60, wedge element 44A may be driven free of tight engagement with recess 40A and thereby relieve the interference fit between drive shaft sections 24A at surfaces 36A and 38A of the respective sections.

It is believed now readily apparent that the present invention provides an improved coupling means for a multi-sectional drive shaft of a modular constructed rotary mechanism which permits inner modules to be removed and replaced without disassembly and reassembly of the other adjacent modules. It is a coupling means of relative simplicity and inexpensiveness which can be assembled and disassembled quickly and easily.

Although two embodiments of the invention have been illustrated and described in detail, it is to be expressly understood that the invention is not limited thereto. Various changes can be made in the arrangement of parts without departing from the scope and spirit of the invention as the same will now be understood by those skilled in the art.

What is claimed is:

1. In a rotary piston mechanism having modular units and at least one split intermediate housing section, a multi-sectional drive shaft comprising
   a. a drive shaft section for each unit;
   b. passageway means extending longitudinally through each of said drive shaft sections and in registry with each other;
   c. means for connecting adjacent drive shaft sections in torque transmitting relationship adjacent each of the abutting surfaces of the split intermediate housing section comprising:
      1. one drive shaft section having a coaxial annular first recess in one end portion;
      2. the adjacent other drive shaft section having a cylindrical end portion receivable in the annular recess of said one drive shaft section;
      3. a second recess having a tapered, annular surface in the end portion of said other drive shaft section;
      4. force means separate from said drive shaft sections and having a peripheral surface of substantial complementary taper to the tapered surface of said second recess being disposed within said second recess;
      5. actuating means accessible from outside the rotary mechanism through said passageway means for axially moving said force means relative to said second recess so as to exert radially outwardly directed forces on said one drive shaft section to expand the latter without axial movement of the drive shaft sections relative to each other and thereby maintain said drive shaft sections in tight abutting relationship for torque transmission.

2. The apparatus of claim 1 wherein said one drive shaft section has said one end portion enlarged for strength.

3. The apparatus of claim 1 wherein said force means has a threaded opening and said actuating means is a bolt turned into said threaded opening, the head of the bolt engaging said other drive shaft section.

4. The apparatus of claim 1 wherein said actuating means is a sleeve having externally threaded end portions, one threaded end engaging the force means and the other threaded end engaging said other drive shaft section.

5. The apparatus of claim 4 wherein said threaded end portions are of different pitch.

* * * * *